Dec. 27, 1949  C. A. DE GIERS ET AL  2,492,273
GALVANOMETER WITH FLOAT SUPPORTED SPINDLE
Filed July 20, 1946  2 Sheets-Sheet 1

INVENTORS.
CLARENCE A. DE GIERS
ROLF A. F. SANDBERG
BY
Ernest D. Given
ATTORNEY

INVENTORS.
CLARENCE A. DEGIERS
ROLF A. F. SANDBERG
BY Ernest D. Given
ATTORNEY

Patented Dec. 27, 1949

2,492,273

UNITED STATES PATENT OFFICE 2,492,273

GALVANOMETER WITH FLOAT SUPPORTED SPINDLE

Clarence A. de Giers, Forest Hills, and Rolf A. F. Sandberg, Queens Village, N. Y., assignors to The Liquidometer Corporation, Long Island City, N. Y., a corporation of Delaware Application July 20, 1946, Serial No. 685,112

2 Claims. (Cl. 171—95)

The present invention relates generally to indicating instruments and has particular reference to methods of supporting the moving systems of such indicators.

Indicators having movable elements usually have the disadvantage that the weight of the moving elements introduces errors due to friction in the bearings. Attempts have been made to overcome this difficulty by making the moving elements as light as possible and by the use of more delicate bearings; but this involves tedious manufacturing methods which manifest themselves in increased costs.

A main object of the invention is to provide a method of neutralizing the weight of the moving system of an indicator on its bearings, thus rendering the instrument essentially free from the effects of friction. This is accomplished by supporting the system on a float operating in a bath of liquid in such a way that substantially the entire weight of the moving system is supported by the float instead of by the bearings.

Another object of this invention is to provide an indicator having improved damping characteristics and one which is not affected by moisture.

Other and further objects of this invention will be more apparent after an examination of the specification in conjunction with the accompanying drawings. It is understood, however, that the drawings are for the purpose of illustration only and are not intended to define the limits of the invention.

Figure 1:
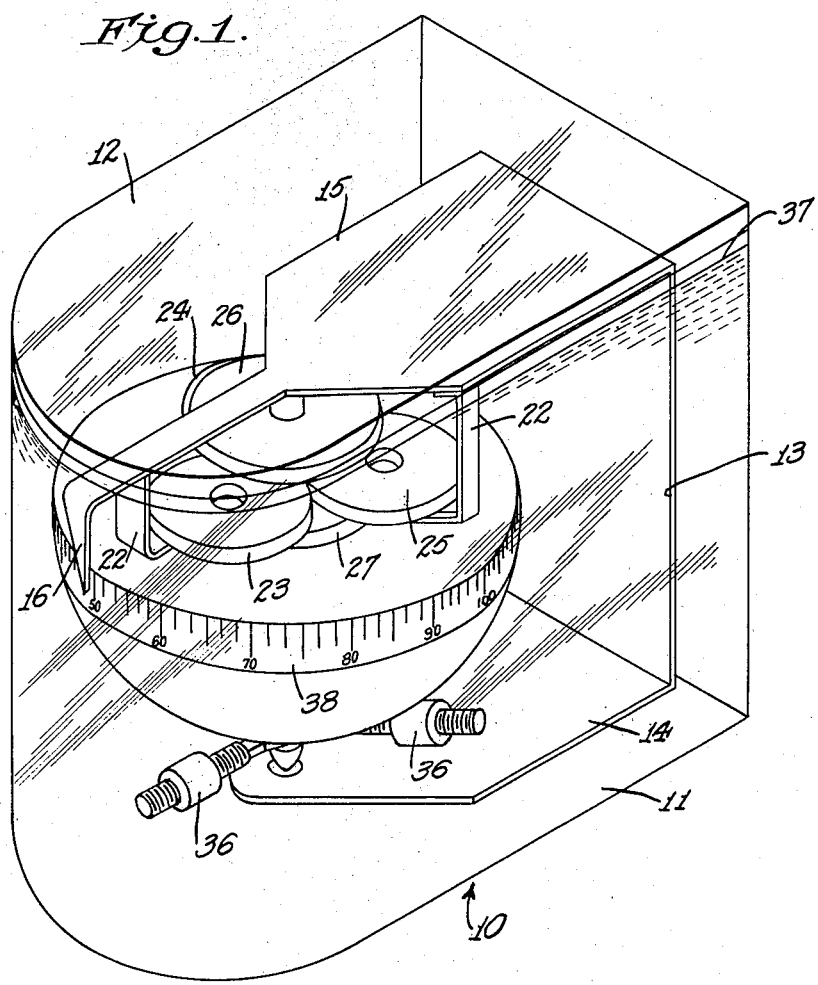
Fig. 1 is a general view substantially in perspective of an indicating instrument showing the principle of the invention.
Figure 2:
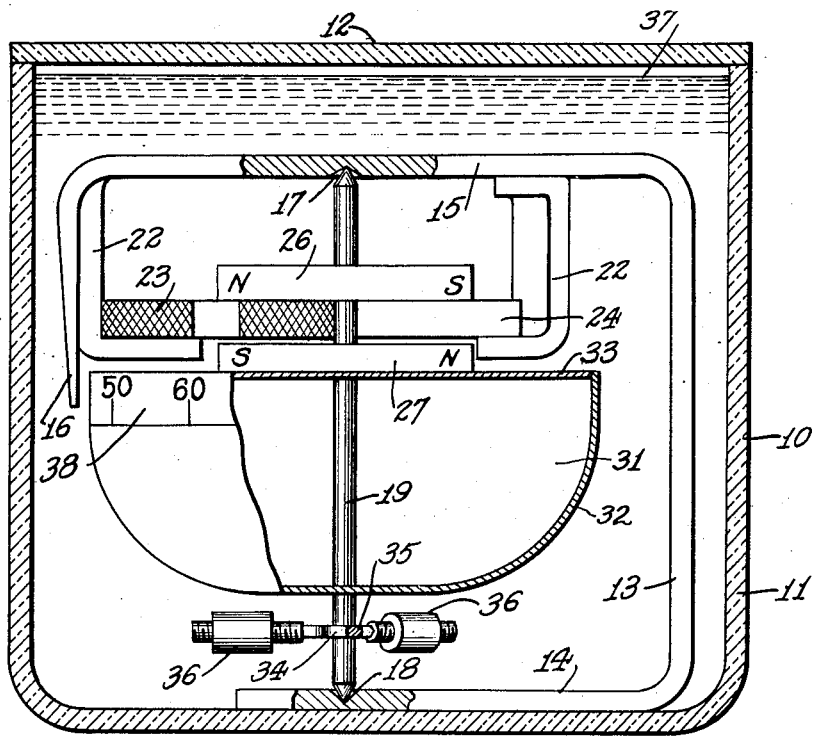
Fig. 2 is a side view, partly in section, of the instrument shown in Fig. 1.

In the drawings, the indicator as an entirety is designated 10. It comprises a casing or housing member 11, which may be molded from glass or other transparent material, closed by a transparent cover 12. This cover may be sealed in place. Instead of making the entire casing or housing of transparent materials it may, of course, be composed of other materials with only a transparent portion through which the internal mechanism may be viewed.

Within the housing is a support or frame 13 having a bottom portion 14 resting on or secured to the bottom of the housing member 11 and a forwardly extending upper portion 15 which is constructed to provide a pointer 16, the purpose of which will be made clear later on. The portions 14 and 15 of the frame are provided with conical recesses 17 and 18 constituting bearings to receive the pointed ends of a shaft 19.

Attached to the underside of the portion 15 of the frame 13 and the pointer 16 are three brackets 22, only two of which appear in the drawings. Each of the three brackets supports a disc-like coil 23, 24, 25.

Secured to the shaft 19 are two permanent magnets 26 and 27 which are magnetized across their diameters and so arranged relatively that the positive pole of one is opposite the negative pole of the other.

The three coils 23, 24, 25, the magnets 26 and 27, and a way of causing them to function in an indicator are fully described in application Serial No. 633,800 filed December 8, 1945 by Clarence A. de Giers and Soren B. Osterlund which is now Patent No. 2,450,331, issued September 28, 1948. A similar arrangement for causing the coils and magnets to function will be referred to briefly later on. It is sufficient at this point to say that the magnets and the coils cooperate to turn the shaft 19 from a zero or starting position to any angular position and from one angular position to another within the indicating range of the particular instrument.

Secured to the shaft 19 is an element 31 which is usually referred to herein as a float. Preferably it is made of thin light metal and includes a hollow bowl shaped portion 32 which is hermetically sealed, as by a cover 33, the interior containing air at atmospheric pressure or possibly partially evacuated before sealing.

Near its lower end the shaft 19 carries a spider 34, the three arms 35 of which are threaded to cooperate with weights 36. These weights may be adjusted along the arms 35 to attain a fine balance of the shaft 19 in its bearings and weights of different sizes may be used to adjust the buoyancy of the float 31 to the particular fluid used in connection with the float. Preferably, the fluid is an oil which substantially fills the housing 11, the level being indicated at 37. As will be seen, both the stationary parts and the movable parts of the apparatus are all submerged in and protected by the oil. The fact that the weights 36 and their supporting spider arms 35 move through the oil when the shaft 19 turns causes them to serve efficiently in damping out undesired movements of the shaft 19 and the parts attached thereto.

The bowl shaped portion 32 of the float carries scale 38 cooperating with the pointer 16. As the shaft 19 is turned under the influence of the stationary coils and the permanent magnets 26 and 27 attached to the shaft, the scale indicia opposite the pointer will indicate the value which has been impressed by the coils on the moving part of the system. The indicia of the scale 38 may be marked directly on the float, although for purposes of shielding, it is preferable to mark them on a band of soft iron secured around the float. If such a band is employed, the instrument will be free from errors due to hysteresis because of the fact that there will be no relative movement between the shield and the magnetic elements. The fact that the magnetic elements are supported by the buoyancy of the fluid, permits larger masses to be used thus affording greater freedom of design.

Figure 3:
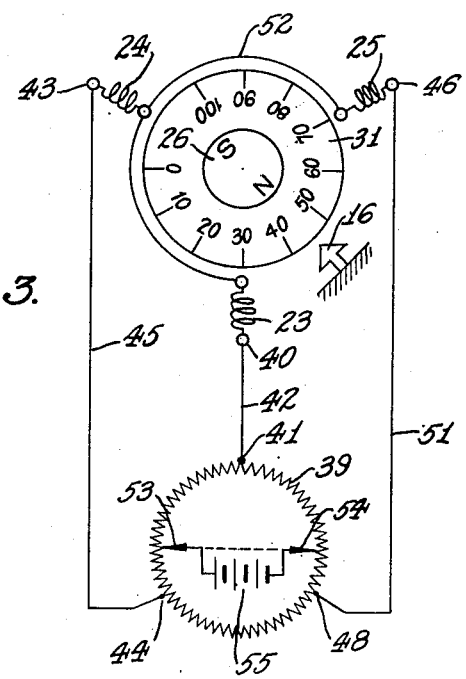
Fig. 3 is a schematic wiring diagram illustrating a typical application of the invention.
Figure 4:
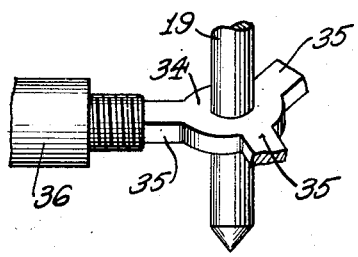
Fig. 4 is a fragmentary detail view in perspective and on a larger scale illustrating the mounting for the adjustable balancing weights shown in Figs. 1 and 2.

The instrument so far described may be connected to and indicate the position of a toroidal transmitter comprising a resistance element 39 (Fig. 3). The end 40 of coil 23 is connected to tap 41 of the resistance element by a wire 42. The end 43 of the coil 24 is connected to tap 44 of the transmitter by a line wire 45. Similarly the end 46 of the third coil 25 is connected to tap 48 of the transmitter 39 by a line wire 51. The other ends of the coils 23, 24 and 25 are connected together by a wire 52. Wiper arms 53 and 54 are mounted to extend diametrically opposite to each other and are connected to a source of power supply 55.

In operation, as the wipers 53 and 54 move around the resistance element 39 of the toroidal transmitter the voltage distribution across coils 23, 24 and 25 will vary. The resultant field of the three coils will cooperate with the magnets 26 and 27 to turn the movable portion of the instrument so that the pointer 16, in cooperation with the scale 38, will indicate the position of the wipers 53 and 54. The wipers may be moved by a float or other system which is controlled by the rise and fall of the liquid in a tank, although obviously the wipers may be adjusted by any sort of a medium which can be measured by an indicating instrument of the character herein described.

It is obvious that while the invention has been shown and described as embodied in an instrument having a vertical shaft, the shaft may actually be made to operate in any desired position. The invention may also be made applicable to a moving coil type of meter and to any feasible circuit combination. In fact the invention is capable of use generally in instruments of the character described regardless of the particular means employed for imparting movement to the movable systems or parts thereof.

It is apparent that in any of the embodiments described or referred to the invention affords an economical and highly satisfactory way of obtaining accurate indication because all friction between the moving elements and the stationary elements is substantially eliminated.

While the invention has been explained by describing mainly a specific embodiment, it is not the desire to be limited by anything set forth in the foregoing specification or in the drawings except to the extent indicated by the claims which follow.

What is claimed is:

1. A device of the character described comprising a liquid filled container having at least one transparent wall portion, a supporting frame in the container below the level of the liquid, a rotatable shaft mounted in bearings on said frame, means for turning said shaft to various angular positions, a float secured to said shaft, a plurality of arms rigid with and extending radially from the shaft, weights on said arms adjustable individually to balance the shaft in its bearings, said weights being selected as to size to adjust the buoyancy of the float, an indicator scale on the float visible through the transparent portion of the container wall and an indicator pointer on the frame cooperating with said scale.

2. In an indicating instrument of the character described, a housing filled with a fluid and having at least one transparent wall, a stationary assembly within said housing comprising a plurality of coils, a rotatable assembly within said housing comprising a rotor shaft, two transversely magnetized rotor magnets fixed on said shaft and having opposite polarities and arranged one on either side of said coils in a direction axially of said shaft cooperating with said coils, means secured to said shaft for buoying the rotatable assembly in the fluid, an indicating pointer rigid with the stationary assembly, and an indicator scale on the moving assembly cooperating with the pointer, said pointer and said scales being visible through said transparent wall of the housing, and said indicator scale being marked on a strip of soft iron secured to the movable assembly adjacent to the position of said rotor magnets and said coils.

CLARENCE A. DE GIERS.
ROLF A. F. SANDBERG.

REFERENCES CITED

The following references are of record in the file of this patent:

UNITED STATES PATENTS

| Number | Name | Date |
|---|---|---|
| 1,589,039 | Anschatz-Kaempfe | June 15, 1926 |
| 1,933,493 | Chessin | Oct. 31, 1933 |
| 2,057,845 | Pattee | Oct. 20, 1936 |
| 2,153,565 | Isaacson | Apr. 11, 1939 |
| 2,450,331 | De Giers et al. | Sept. 28, 1948 |